(12) United States Patent
Steelberg et al.

(10) Patent No.: US 10,552,877 B2
(45) Date of Patent: Feb. 4, 2020

(54) ENGINE AND SYSTEM FOR THE TRANSCRIPTION AND ASSESSMENT OF MEDIA FILES

(71) Applicant: VERITONE, INC., Newport Beach, CA (US)

(72) Inventors: Ryan Steelberg, Irvine, CA (US); Chad Steelberg, Newport Beach, CA (US)

(*) Notice: Subject to any disclaimer, the term of this patent is extended or adjusted under 35 U.S.C. 154(b) by 628 days.

(21) Appl. No.: 15/241,828

(22) Filed: Aug. 19, 2016

(65) Prior Publication Data

US 2017/0053323 A1  Feb. 23, 2017

Related U.S. Application Data

(60) Provisional application No. 62/207,107, filed on Aug. 19, 2015.

(51) Int. Cl.
| | |
|---|---|
| *G06Q 30/02* | (2012.01) |
| *G06F 17/27* | (2006.01) |
| *G10L 15/26* | (2006.01) |
| *G10L 25/87* | (2013.01) |
| *H04L 29/08* | (2006.01) |

(52) U.S. Cl.
CPC ..... *G06Q 30/0276* (2013.01); *G06F 17/2785* (2013.01); *G10L 15/26* (2013.01); *G10L 25/87* (2013.01); *H04L 67/02* (2013.01)

(58) Field of Classification Search
CPC ................................ G06Q 30/02; G06F 17/30
See application file for complete search history.

(56) References Cited

U.S. PATENT DOCUMENTS

| | | | |
|---|---|---|---|
| 9,129,008 B1* | 9/2015 | Kuznetsov | G06F 16/435 |
| 9,204,098 B1* | 12/2015 | Cunico | H04N 7/15 |
| 9,208,502 B2* | 12/2015 | Parikh | G06Q 30/0201 |
| 9,336,268 B1* | 5/2016 | Moudy | G06F 16/244 |
| 2004/0054694 A1* | 3/2004 | Piccionelli | G06Q 30/02 |
| 2009/0232032 A1 | 9/2009 | Kelley | |
| 2010/0017260 A1 | 1/2010 | Hamilton, II et al. | |
| 2010/0131085 A1* | 5/2010 | Steelberg | G06Q 30/02 |
| | | | 700/94 |
| 2012/0046936 A1* | 2/2012 | Kandekar | G06Q 30/0282 |
| | | | 704/9 |

(Continued)

OTHER PUBLICATIONS

WO, PCT/US2016/047881 ISR and Written Opinion, dated Dec. 27, 2016.

*Primary Examiner* — Sun M Li
*Assistant Examiner* — Thuy N Nguyen
(74) *Attorney, Agent, or Firm* — One LLP; Joseph K. Liu

(57) ABSTRACT

A system and method for publishing endorsed media is disclosed herein. The system receives a media file and then transcribes a portion of the media file to produce a transcribed script for the media portion. The system then extracts one or more sentiments based on the transcribed script and media data of the media file. Next, the system associates the one or more extracted sentiments to one or more keywords in the transcribed script. Trending topic around the Internet is then determined. In one aspect, the system then publishes the media portion over the network based on a match between the trending topic and the one or more keywords associated with the one or more extracted sentiments.

17 Claims, 6 Drawing Sheets

(56) References Cited

U.S. PATENT DOCUMENTS

| | | | |
|---|---|---|---|
| 2012/0191730 A1* | 7/2012 | Parikh | G06Q 30/0201 |
| | | | 707/754 |
| 2012/0278164 A1* | 11/2012 | Spivack | G06Q 10/10 |
| | | | 705/14.52 |
| 2013/0246168 A1* | 9/2013 | Wickramasuriya | H04N 21/812 |
| | | | 705/14.49 |
| 2013/0311485 A1 | 11/2013 | Khan | |
| 2014/0023348 A1* | 1/2014 | O'Kelly | G11B 27/031 |
| | | | 386/278 |
| 2014/0201227 A1* | 7/2014 | Hamilton-Dick | G06F 16/9535 |
| | | | 707/758 |
| 2015/0255066 A1* | 9/2015 | Wilder | G06K 9/00744 |
| | | | 704/235 |
| 2016/0004500 A1* | 1/2016 | Abuelsaad | G06T 13/205 |
| | | | 707/722 |
| 2017/0118339 A1* | 4/2017 | Watson | H04M 3/5175 |

* cited by examiner

ENGINE AND SYSTEM FOR THE TRANSCRIPTION AND ASSESSMENT OF MEDIA FILES

CROSS-REFERENCE TO RELATED APPLICATION

This application claims priority to U.S. Provisional Application No. 62/207,107, entitled "ENGINE AND SYSTEM FOR THE TRANSCRIPTION AND ASSESSMENT OF MEDIA FILES", filed Aug. 19, 2015, which application is hereby incorporated in its entirety by reference.

FIELD OF THE INVENTION

Various aspects of the disclosure relate to creating and publishing advertisement. In one aspect, the disclosure is directed to an engine, system and method of providing transcriptions for use in sentiment based advertisement.

BACKGROUND

The impact on an ideal customer of any particular advertisement may be improved if an advertisement includes endorsements, sponsorships, or affiliations from those persons, entities, or the like from whom the ideal target consumer is most likely, or highly likely, to seek guidance. Factors that will increase the impact of an endorser include the endorser's perceived knowledge of particular goods or in a particular industry, the frame or popularity of the endorser, the respect typically accorded a particular endorser or sponsor, and other similar factors.

Consequently, the highest impact advertising time or block available for sale will generally be time that is associated with an endorser most likely to have high impact on the ideal target customer. However, the existing art makes little use of this advertising reality.

SUMMARY OF THE INVENTION

Traditional ways of advertising using printed media or even scheduled broadcast television advertisements (ads) are still useful and still have market relevancy. However, these ads are static. In other words, they are made and scheduled for publishing well in advance of any recent trends and/or news development. As such, these ads are less efficient and may be ineffective as they fail to take advantage of recent trends and news. Accordingly, a system and method for generating ads using media sentiments and live trend, current event, news, etc., is disclosed herein. The method includes: transcribing a portion of a media file to produce a transcribed script for the media portion; extracting one or more sentiments based on the transcribed script and media data of the media file; associating the one or more extracted sentiments to one or more keywords in the transcribed script; analyzing information from one or more sites on the Internet to determine a trending topic; and publishing the media portion over the network based on a match between the trending topic and the one or more keywords associated with the one or more extracted sentiments.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Although traditional ways of advertising using printed media or scheduled broadcast television advertisements (ads) are still useful and have market relevancy, ads in these traditional mediums and modes are slow to react to news, trends, consumers' whims, etc. Obviously, scheduled ads still have their place in today's market place. But as technology progresses and the world becomes even more connected and integrated, advertisements must become nimbler to react and take advantage of current events, trends, fads, whims, etc. Accordingly, what is needed is an ads creation method and system that incorporates trends or hot topics with sentiments and keywords of a media. This is herein referred to as sentiment-keyword matched media.

Figure 1:
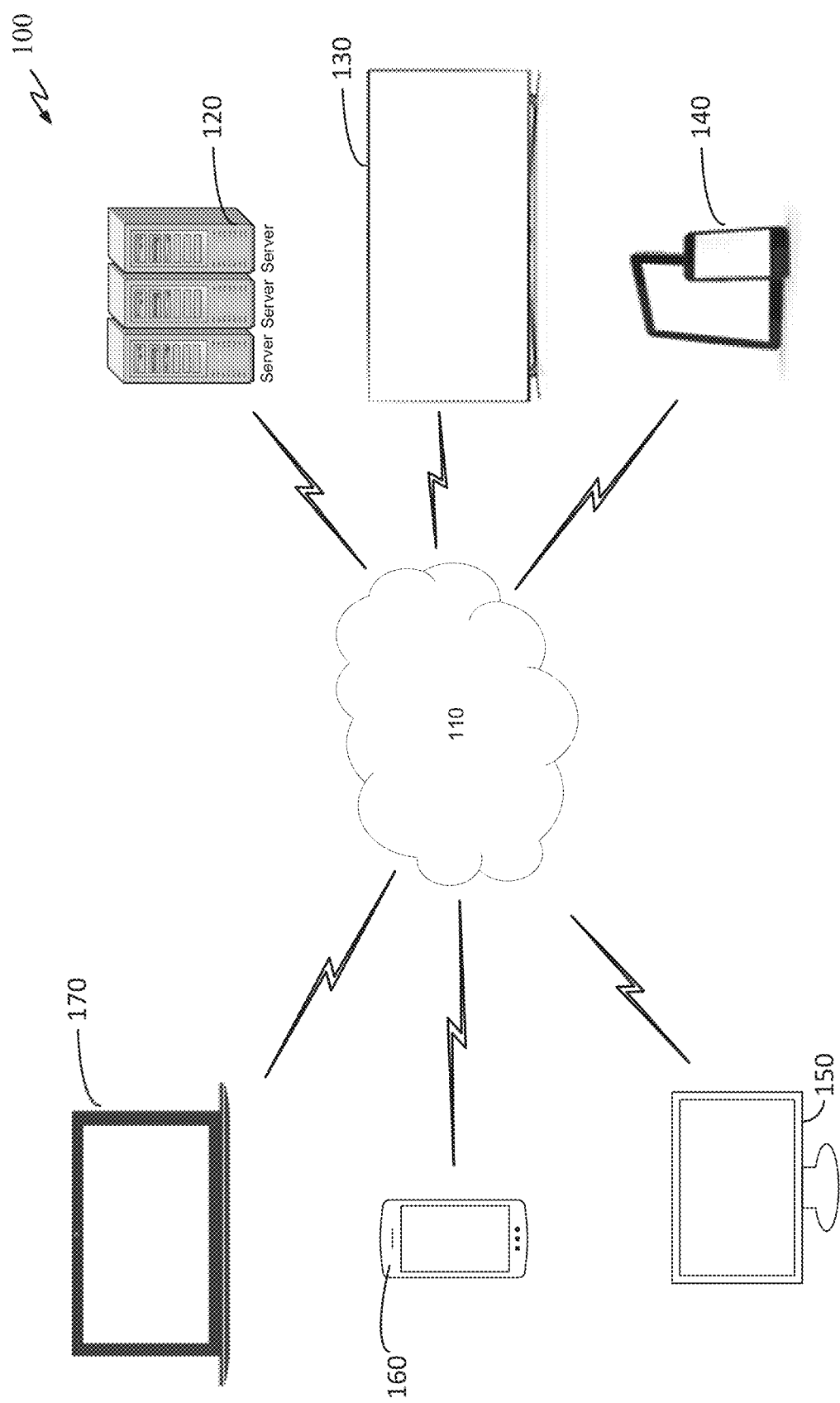
FIG. 1 illustrates an exemplary advertising environment in accordance to one aspect of the disclosure.

FIG. 1 illustrates an exemplary environment 100 in which most advertisement campaigns operate, with the exception of printed advertisement media. As shown in FIG. 1, Environment 100 includes a network 110, a server 120, a television 130, portable devices 140, a desktop computer 150, a mobile device 160, and a laptop 170. Network 110 is a distribution network where ads media are sent, received, and exchanged. Network 110 may be the Internet, a satellite network, a wide area network (WAN), a local area network (LAN), a wireless local area network (WLAN), or a combination thereof. Server 120 may be an ads server configured to serve ads to connected television 130 or to a set-top box (not shown) that is connected to television 130. Server 120 may also serve ads by inserting ads into a streaming video that can be viewed on personal computing devices 140, mobile device 160, laptop 170, or any other connected devices. Server 120 may also serve ads to mobile applications, running on mobile device 160, such as games or other free to use mobile applications.

Sentiment-Keyword Matched Media

Figure 2:
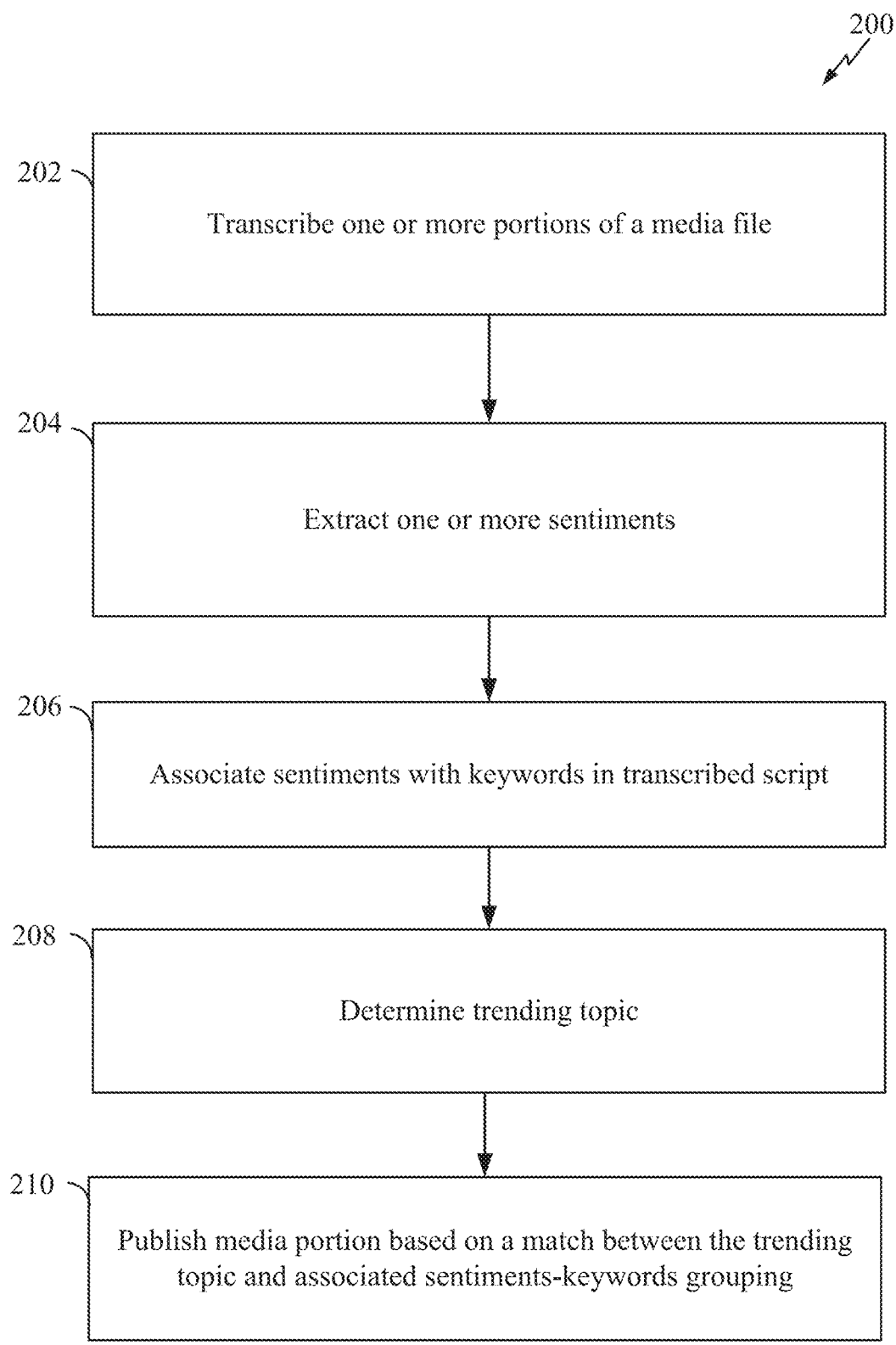
FIG. 2 illustrates an exemplary process for creating sentiment-keyword matched media for use in advertisement campaign in accordance to an aspect of the disclosure.

FIG. 2 illustrates a process 200 for generating a sentiment-keyword matched media for use in an advertisement campaign in accordance to one aspect of the disclosure. Process 200 begins at 202 where one or more portions of a media file is transcribed. The media file may be sent to the server from a client device. Alternatively, the media file may be a live broadcast program, a streamed program, or a stored media file in a media vault. The transcription may be automatically done by a transcription module/engine (not shown) residing on server 120, for example. Alternatively, the transcription may be done manually or using closed caption metadata where available.

Prior to transcribing a media file, server 120 or transcription module may split the media file into a plurality of chunks. Each of the chunks may be a couple minutes in length, 5 mins in length, or 10 mins in length, etc. Transcription module may be a standalone module residing on server 120. Once the media file or a portion of the media file is transcribed, the transcribed script is associated and stored with the media portion. The transcribed script may then be used to assign keywords to the portion of the media file.

Keywords may be selected automatically based on the frequency of a word. Keywords may also be selected using metadata associated with the portion of the media file. For example, if the metadata of the file portion indicates that the media file portion is a fight scene in the movie Matrix, keywords such as "Matrix", "virtual reality" and "fight" might be selected and assigned to the media file portion. Alternatively, keywords may be selected based on a combination of using frequency of appearance and metadata. Using the same fight scene as an example, a combinational keywords assignment method using both the metadata of the media file portion and the script extracted from the media file portion may yield the following keywords: "Neo", "first fight", "virtual reality", "Morpheus", "Kung-Fu", and "Matrix". In one aspect, whenever the transcription of the media file portion is not possible due to a high level of noise or otherwise unavailable, the metadata for closed captioning may be used in place of or to supplement the transcribed script.

At 204, one or more sentiments are extracted using the transcribed script. In one aspect, both the transcribed script for the media file portion and the metadata of the media file portion are used to extract one or more sentiments. The sentiments extraction process may involve the assessment quality, quantity, or associated phraseology related to the mention of a word. As such, dataset generation of the mention of the word has occurred, and thereafter a value may be ascribed 607 to the word said. That is, the time of the mention maybe assessed, whereby an assessment maybe made of what time of day, such as in certain markets, a mention is more meaningful. Likewise, if a word is said more frequently at given times in a sixty second span than at other times, an assessment maybe made as to the enhancement to the value of the word based on the frequency of mentions of the word.

In one aspect, the sentiments extraction process may employ a hierarchal structure to show that what is said in the media file portion and to show whether an impact on human behavior is resulted. Accordingly, ad providers may receive an assessment that ads do or do not have the impact intended by the ad providers. Thus, the ad providers may change the time of an ad, ad copy, or the like, in order to obtain the intended impact as opposed to the actual measured impact. Thus (as detailed below), the process for generating sentiment-keyword matching media may turn spoken word may into actionable intelligence. By way of non-limiting example, a bank may assess its call source data in the form of mentioning auto loans during telephone calls related to mortgage applications over a 30-day span. During that time, the bank may experience an increase in the issuance of auto loans of 18%, and thus the dataset related to the audio files of the mortgage applicant's calls may indicate the significant impact of the placement of an ad related to other types of loans during a mortgage call.

In one aspect, sentiments extraction may be provided based on tone or inflection using the dataset and audio files provided from the core engine. For example, a statement may be made on sports talk radio that "LeBron James has fewer championships than Jordan, and he sure can't shoot like Kobe, but he is the best player in the world." Although the statement has negative aspects to it, an application may be able to assess that the statement in its entirety is actually positive in nature, rather than negative as two-thirds of the assertions are negative in nature if taken out of context.

Sentiments extraction may depend on different acoustic models, that is, the type of microphone used by the speaker, the identification of the speaker, the position of the speaker, the goal of the speaker, or the like. For example, sentiment and impact extraction may indicate that it is vitally important to know the difference between Rush Limbaugh mentioning Taco Bell restaurants on his radio show, and a Taco Bell commercial playing during a break of the Rush Limbaugh show. The structure of the core engine discussed herein, wherein datasets are treated as related to but discreet from related audio files, may allow for various data manipulations and data extractions. For example, both public and private media may be given treatment by the core engine. That is, private media, such as maybe accessed, or have the data associated therewith accessed, only by a select few maybe available by the core engine, such as based on login from only those select few. Likewise, data extraction may be uniquely available, such as from a variety of formats including, for example, YouTube. Thereby, surprising indications maybe extracted in the data, such as that an 18-year old with a 100,000 followers on YouTube may influence the purchase of LeBron James' jerseys, based on being renowned as a basketball fashion expert, more than Bob Costas, or a like well-known broadcaster.

In one aspect, sentiments extraction may include performing a wave profile analysis of the audio data of the media portion. A wave profile analysis may be done by analyzing frequency and amplitude profile of spoken words in the audio data. On a high level, a wave profile analysis is performed by first obtaining a baseline amplitude profile and a baseline frequency profile for the audio data. In one aspect, the baseline amplitude and frequency profiles are obtained over the entire duration of the audio data of the media file. Alternatively, baseline profiles may be sampled at various portions of the audio data. Once the baseline profiles are established, new amplitude and frequency profiles may be obtained for specific portion of the media file. A comparison is then made to determine whether the new amplitude and frequency profiles change dramatically with respect to the baseline profiles. If the changes are above a certain threshold, then the location (time period) where the threshold is reached is flagged. Spoken words and metatdata for the same time period are also extracted to use as keywords.

In one aspect, a sentiment value may be assigned to the threshold-breaching event at 206. For example, if the amplitude profile is very high during the threshold-breaching event, then a sentiment value may be assigned as excitement, anger, or elation etc. Changes in the frequency profile may indicate varying inflection. Depending on the words being spoken, the sentiment value may be classified as nervousness, anxious, calm, fear, etc.

The assigned sentiments value by itself may not be as indicative or instructive as when it is combined with keywords in the transcribed script during the threshold-breaching event. Accordingly, in one aspect, the sentiment value is associated with one or more keywords in the media file that appeared or relevant to the portion of the media file in which the threshold-breaching event occurred. In this way, the sentiment-keyword association may provide a more accurate way of measuring the real sentiment for the portion of the media file being analyzed. For example, when the sentiment "anger" is matched to keywords such as "go away" or when the sentiment "excitement" is matched to keywords such as "this is awesome", then most likely the sentiment assigned to the media portion matches very well with the real human sentiment associated to that particular portion of the media file.

In one aspect, keywords may be extracted from the media file using timestamp for the threshold-breaching event. For example, if the threshold-breaching event occurs at 12:35 into the media, then keywords may be extracted starting at that timestamp. In one aspect, keywords may be extracted 5, 10, or 15 seconds before and after the timestamp of the threshold breaching event. It should be noted that the duration of the keywords extraction may be changed to fit the length of the scene, mood, sentiment, etc.

At 208, trending topic is determined. This may be accomplished by polling various websites such as news outlets and/or social networking sites. In one aspect, the top 10 trends may be determined.

At 210, one or more of the trends determined at 208 is matched to keywords in the sentiment-keyword pairing or group. If a match is found, then the media portion associated with the matched sentiment-keyword is made available for publication or ads insertion. In one aspect, sentiment-keyword-trend matched media is automatically published to a $3^{rd}$ party website, or automatically inserted into a video stream for delivery to connected television 130, personal devices 140, or mobile devices 160, etc. In this way, the ads generated by process 200 are nimbler and more relevant to topics consumers care about or are paying attention to as the sentiment-keyword matched ads accurately reflect current trends, news, fashions, consumers' whims, etc.

Figure 3:
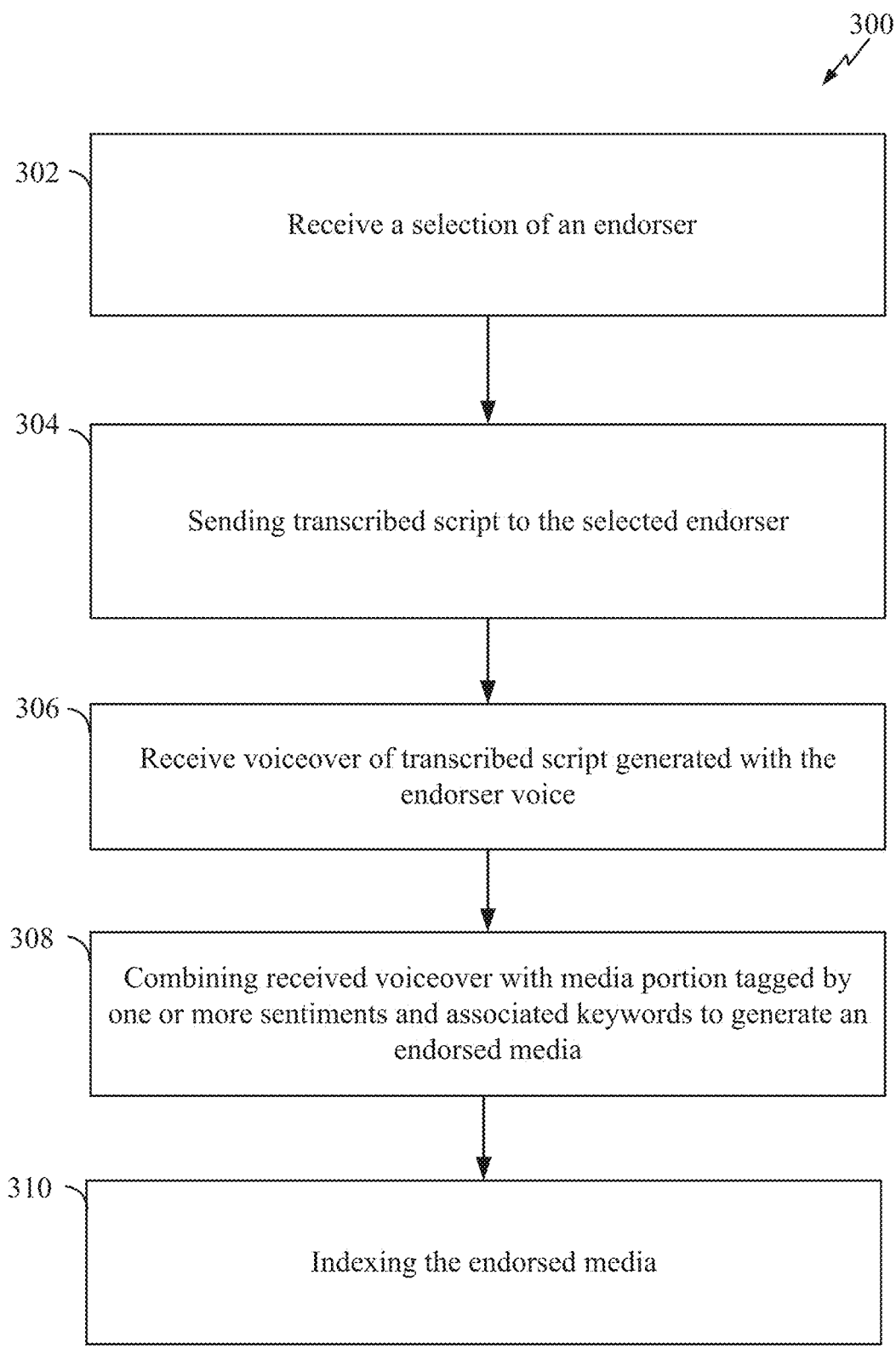
FIG. 3 illustrates an exemplary process for creating an endorsed-sentiment-keyword matched media for use in advertisement campaign in accordance to an aspect of the disclosure.

FIG. 3 illustrates an exemplary system's process 300 for generating an endorsed sentiment-keyword matched media. Process 300 begins at 302 where selection of an endorser is received by server 120. The selection of an endorser may be made by a user at a client device (e.g., mobile device 160). The selection may be made using a list of available endorsers made available to the user's device by server 120. Once server 120 receives the selection of an endorser, server 120 sends the transcribed script to the selected endorser at 304 along with one or more requests and instructions from the user. The request may be asking the endorser to do a voiceover for the portion of media file using the transcribed script.

At 306, voiceover of the transcribed script, generated using the voice of the endorser, is received. At 308, the voiceover is combined with the media portion that was previously sentiment-keyword matched to generated an endorsed-sentiment-keyword matched media. In one aspect, the voiceover replaces the original audio track/data of the media file. At 310, the endorsed sentiment-keyword matched media is indexed or published to $3^{rd}$ party sites. In one aspect, an avatar of the endorser is also generated and combined with the sentiment-keyword matched media. In this way, when combined media is viewed the visual avatar and the voice of the endorser can be seen and heard by consumers.

Figure 4:
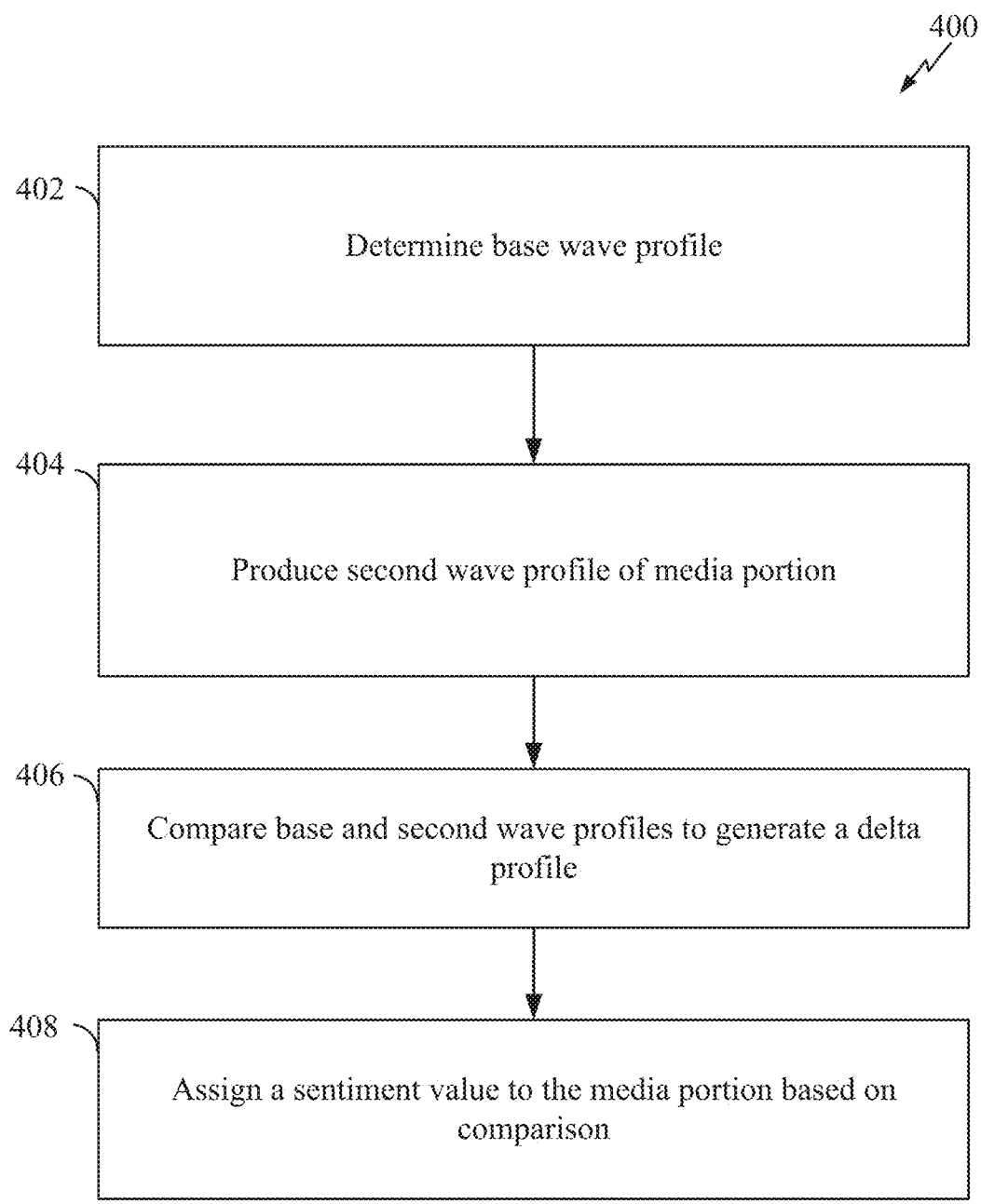
FIG. 4 illustrates an exemplary process for assigning a sentiment value to a media in accordance to an aspect of the disclosure.

FIG. 4 illustrates an exemplary process 400 for assigning a sentiment value to a media in accordance to an aspect of the disclosure. In particular, process 400 outlines the algorithms/instructions for analyzing a wave profile of a media file. Process 400 may be implemented by one or more processes 200 and 300. At 402, a baseline wave profile for an audio track of a media file is generated. A baseline profile may be generated using a portion of the media file. A baseline profile includes an amplitude profile and a frequency profile, each of which may be an average amplitude or frequency during the entire span of the audio data for the media portion. Amplitude information may provide the general volume of the track or the volume of spoken words in the audio track. Frequency information may provide indication to mood, inflection, general feeling of the track. As previously mentioned, when the wave profiles are analyzed in conjunction with keywords and metadata for the media portion, a more accurate classification of the sentiment can be obtained.

Once the baseline wave profile is determined, another wave profile is generated for a specific portion of the media file at 404. Next, the new wave profile is compared with the baseline profile to obtain a delta profile at 406. In one aspect, delta profiles for amplitude and frequency are generated. If any of the delta profiles exceeds a predetermined threshold, then the media portion is assigned one or more sentiment values at 408.

A sentiment value may depend either on the amplitude or frequency delta profile, or a combination of both delta profiles. For example, certain changes in the amplitude profile such as value of the amplitude change, frequency of changes, and rate of changes with respect to time may indicate fear, anxiety, anger, elation, etc. A sentiment value may be automatically assigned. In one aspect, the media portion where the threshold-breaching event may be flagged which can be revisited to classify or re-classify by a human user at a later time. In the manual sentiment extraction process, a user interface may be employed to automatically display the baseline wave profile, the second wave profile for the specific portion of the media file, the script of the transcription, the audio data/track associated to the portion of the media, and other available metadata (e.g., closed caption, director's notes, etc). In this the user may be able to quickly classify/re-classify the sentiment value for the media portion using all the relevant data displayed on the user interface.

Exemplary Software and Hardware Implementation

Figure 5:
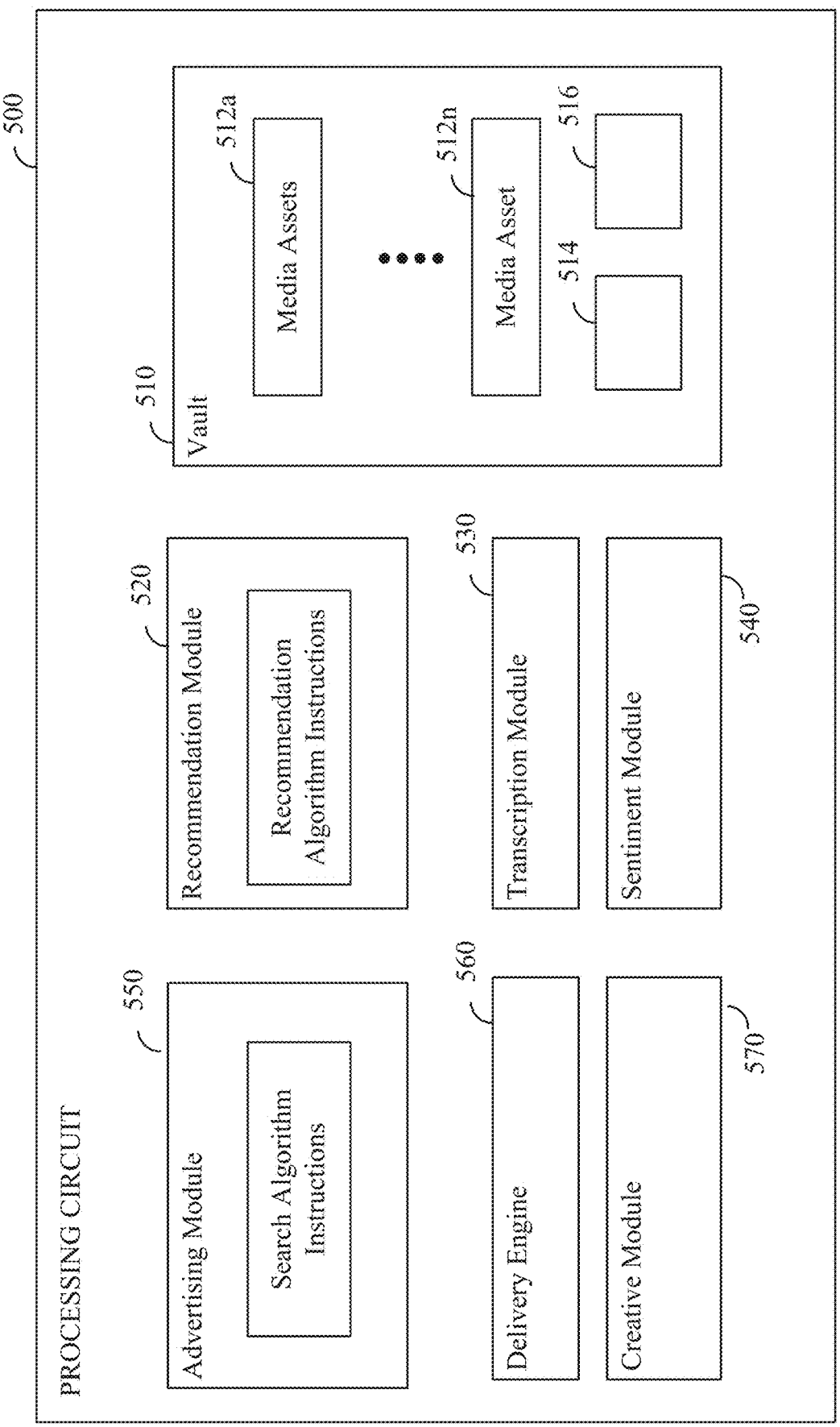
FIG. 5 is a block diagram of exemplary software modules implemented by various aspects of the disclosure.

FIG. 5 illustrates an exemplary processing circuit 500 configured to implement various aspects of the present disclosure. Processing circuit 500 includes a vault 510, a recommendation module 520, a transcription module 530, a sentiment extraction module 540, an advertisement module 550, a delivery module 560, and a creative module 570. It should be noted that one or more modules 510 through 570 may reside on a memory (e.g., RAM, ROM, external memory, etc.) that is accessible by processor 500. Alternatively, one or more modules 510 through 570 may reside on an internal memory of processor 500. One or more of modules 510 through 570 contain instructions and algorithms to execute process 200 of FIG. 2, process 300 of FIG. 3, and process 400 of FIG. 4. Additionally, one or more modules 510 through 570 may be combined with another module to perform the same functions as if they were separate and independent modules. As shown in FIG. 5, vault 510 may contain media assets 512*a*-512*n*. Media assets 512*a*-512*n* may be original assets. Media assets 512*a*-512*b* may also be already transcribed, sentiment extracted, keywords associated, or sentiment-keyword matched assets. Vault 510 may also contain endorser profiles 516 from which a user may select or request for endorsement of the user's products or services. Finally, Vault 510 may also contain user profiles 516.

Recommendation module 520 may access, based on numerous factors including external factors, endorsements that are most sensible for particular client, product, or service. For example, recommendation module 520 may create endorser-media matching by assessing inclusions or exclusions based on factors such as geography, market size, etc. In one aspect, recommendation module 520 may passively or actively inform of the best endorsement matches for a particular user's ads, based on any number of factors. Upon assessment of good matches for the requesting brand, a user of the present invention may have the matching options presented to that user for selection by the recommendation engine, or the user may simply have a best-match selection made for the user. Needless to say, bids for advertising may vary based on the matches obtained by the recommendation engine, and/or the asserted likelihood of success that the ad placed will be successful. Success, of course, may be different in different circumstances, and may include a consumer making an on-line or in-store purchase, a user filling out an on-line or off-line form, a consumer accessing and downloading information or a coupon, or the like.

Transcription module 530 may be configured to transcribe a portion of a media file or a streaming video as it is being received and decoded at the decoder. In this way, near real-time transcription may be achieved. In one aspect, transcription module 530 may also use closed caption metadata to replace and or supplement portion of the transcription. It should be noted that transcription module 530 may contain executable instruction for processor 500 to implement processes 200-400 as described above.

Sentiment module 540 may be configured to extract and assign a sentiment value to a portion of a media file. Sentiment module 540 may include executable instructions for processor 500 to implement sentiment extraction and assignment related procedures as described in processes 200, 300, and 400. Advertising module 550 may contain permissions, rules, cost structures, and form licenses for each media asset 512, endorser profile 514, and user profile 516.

Delivery engine 560 may integrate a requested ad with the media asset from the vault pursuant to the actions by the recommendation engine, and may place a particular ad in the environment it deems best suited for that ad (such as in the event of a re-direct, wherein a web site gives some information about an ad request, and the best ad can be placed responsive to the ad request), late stage bind the ad and media asset for delivery to strongest target consumers (such as with the improvement in later stage tracking for improved ad targeting, such as if the consumer's requesting IP address and/or the referring site information is available just prior to ad delivery), or deliver the static ad and the dynamic media asset from the vault to an advertiser or advertising server, which then independently places the mash up of the ad and media asset.

Improvement in later stage tracking for improved ad targeting may be enabled through the delivery engine 26 and will allow for greater efficiency the trafficking of ads during or after or with or without interface with the delivery engine 26. Efficiency may be obtained by tracking, for example, the data intelligence for use with the delivery of the creative. By way of non-limiting example, data intelligence may include click-thru rate, post-click conversion rate, post-impression activities, as well as geography, demographic and daypart information. Gathered data intelligence may be used as individual properties in conjunction with each other to form or produce the level of intelligence needed to achieve the desired efficiencies. By way of further example, data intelligence may also include information regarding the number of impressions an ad has received, and/or the elapsed time between an impression or a click. Additionally, data intelligence may include information regarding valuable ads or creatives that should have been, but were not, placed, such as, for example, available ad slots online, on television, on radio, or the like, into which a competitor or competitive product or service, was placed. Thereby, data intelligence provides for a reevaluation of value, thus enabling an advertiser to not miss optimal opportunities more than once.

Thus, utilizing data intelligence allows the delivery engine 26 to optimize targeting of new and the equivalent of past targets. Optimization may include efficiencies of time and control over redundancies and ad targeting, for example. Optimization allows for the prediction of probable impressions or clicks that a certain ad or creative may receive when, for example, or that similar past ads have received, for example, with consideration of certain factors, such as demographic and geographic, for example. A prediction may also be made regarding the efficiency of paid searches, and/or may be further contrasted with, for example, display ads. Such information, as drawn from the data intelligence, may also allow for the higher success rates related to redundant ad placement based on prior behavior of a particular audience, for example. The same can be true for the avoidance of redundancy when, for example, data intelligence may be used to keep certain ads or creatives from repeatedly reaching an audience with, for example, low click-through rates.

Redundancy avoidance may also include the avoidance of competing ads or creatives, whether or not placed for the same entity. For example, date intelligence may monitor the number of "avails" of prime time TV characters wearing sports jerseys, and based on Neilsen ratings, the exposures gained by those advertisers placing to such avails. Thus, data intelligence may suggest an optimal value of placing to such avails for a sports jersey seller for future ones of such avails.

The delivery engine 26 may also choose to deactivate and/or modify certain creatives based on data intelligence and/or user direction. The delivery engine may include fulfillment offline, such as on TV, for example. By way of non-limiting example, the data intelligence may be collected from several ad or creative types over any number of varying media formats, allowing for even more sophisticated optimization, and ultimately delivery, based on the allocation of impressions and clicks in the various media formats. Media formats may include, but are not limited to, internet, tv, radio, mobile devices, kiosks, billboards, product placements, and print. By further way of non-limiting example, data intelligence gathered during a run of a creative on the radio may affect the play of an ad on the internet, for example. The delivery engine 26 may additionally allow for the interplay between data intelligence and real time metrics or community-based information. This real time intelligence gathering may also be used to calibrate a campaign(s) of multiple ads or creatives. By way of non-limiting example only, a campaign of with several creative versions may be measured based on gathered data intelligence and optimized to improve, for example, click-through and/or viewership/listenership. Such optimization may thus be done in real time and over multiple media types. The optimization may, by way of further non-limiting example, call for the addition of ads or creatives not currently within the campaign(s), thus suggesting what type of ads or creatives are required for optimization regardless of whether or not the ads or creatives reside in inventory.

Finally, creative module 570 of processor 500 may be configured to combine voiceover generated by endorsers or avatars of endorsers to one or more media assets to create endorsed media assets. Creative module 570 may contain executable instructions for process 500 to implement procedures relating to the combination of avatar and voiceover to pre-existing media assets (e.g., original assets, sentiment-keyword matched assets) as described in processes 200 and 300.

Figure 6:
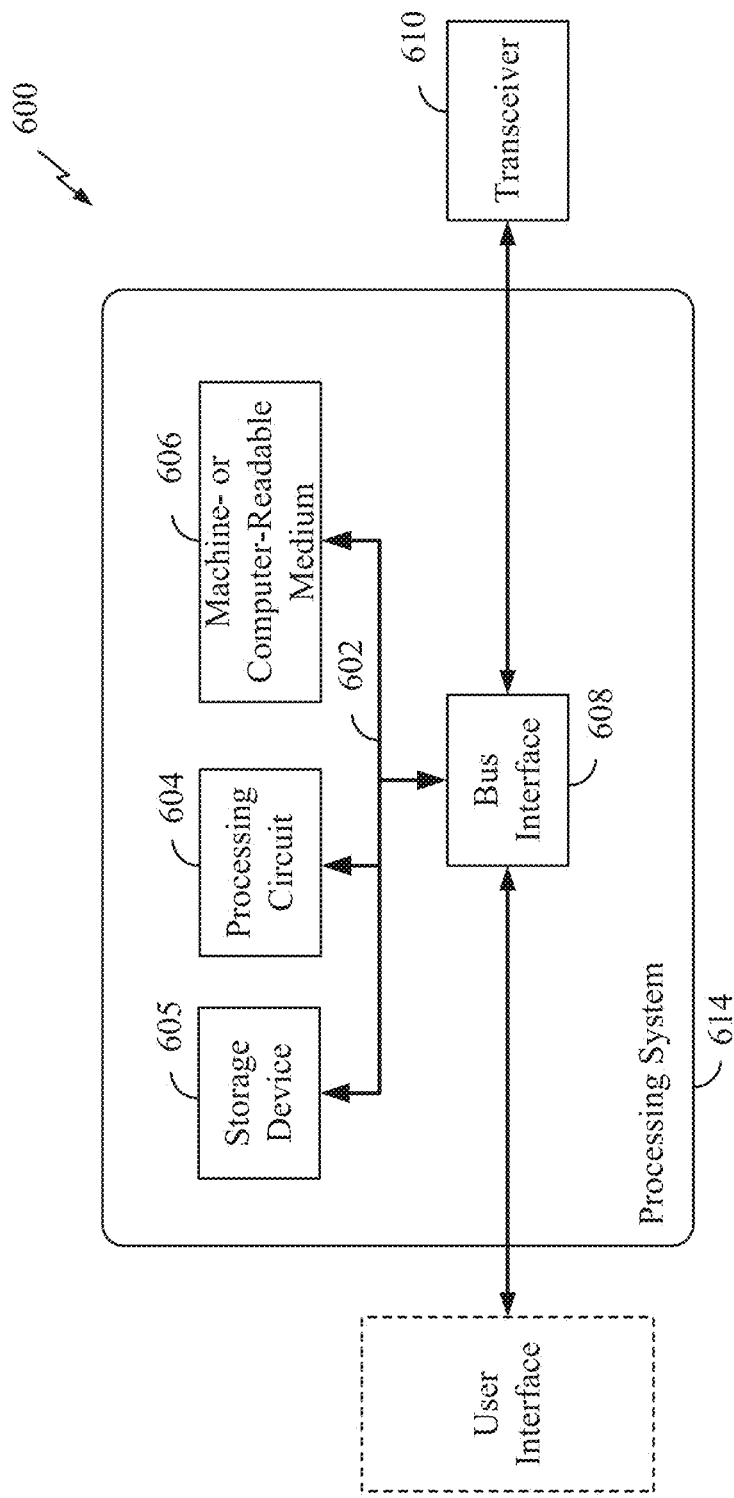
FIG. 6 is a block diagram illustrating an example of a hardware implementation for an apparatus employing a processing system that may exploit the systems and methods of FIGS. 3-10 in accordance with an aspect of the disclosure.

FIG. 6 illustrates an overall system or apparatus 600 in which processes 200, 300, and 400 may be implemented. In accordance with various aspects of the disclosure, an element, or any portion of an element, or any combination of elements may be implemented with a processing system 614 that includes one or more processing circuits 604. Processing circuits 604 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 604 may be used to implement any one or more of the processes described above and illustrated in FIGS. 2, 3, and 4.

In the example of FIG. 6, the processing system 614 may be implemented with a bus architecture, represented generally by the bus 602. The bus 602 may include any number of interconnecting buses and bridges depending on the specific application of the processing system 614 and the overall design constraints. The bus 602 links various circuits including one or more processing circuits (represented generally by the processing circuit 604), the storage device 605, and a machine-readable, processor-readable, processing circuit-readable or computer-readable media (represented generally by a non-transitory machine-readable medium 606.) The bus 602 may also link various other circuits such as timing sources, peripherals, voltage regulators, and power management circuits, which are well known in the art, and therefore, will not be described any further. The bus interface 608 provides an interface between bus 602 and a transceiver 610. The transceiver 610 provides a means for communicating with various other apparatus over a transmission medium. Depending upon the nature of the apparatus, a user interface 612 (e.g., keypad, display, speaker, microphone, touchscreen, motion sensor) may also be provided.

The processing circuit 604 is responsible for managing the bus 602 and for general processing, including the execution of software stored on the machine-readable medium 606. The software, when executed by processing circuit 604, causes processing system 614 to perform the various functions described herein for any particular apparatus. Machine-readable medium 606 may also be used for storing data that is manipulated by processing circuit 604 when executing software.

One or more processing circuits 604 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 606. The machine-readable medium 606 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 606 may reside in the processing system 614, external to the processing system 614, or distributed across multiple entities including the processing system 614. The machine-readable medium 606 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

The invention claimed is:

1. A method for publishing media assets, comprising:
transcribing a first portion of a media file to produce a transcribed script for the first portion;
determining a baseline wave profile of speech from audio data of the media file;
analyzing audio data of the first portion of the media file to produce a second wave profile for the first portion;
assigning sentiment value to the first portion of the media file based on comparison between the base and second wave profiles;
extracting one or more keywords in the transcribed script of the first portion associated with the sentiment value;
analyzing information from one or more sites on the Internet to determine a trending topic; and
publishing the media portion over the network based on a match between the trending topic and the one or more keywords associated with the sentiment value.

2. The method of claim 1, further comprising:
receiving, at a server, a selection of an endorser from a client device;
sending the transcribed script of the media portion to the endorser;
receiving a voiceover of the transcribed script generated with the endorser voice; and
prior to publishing the media portion, combining the received voiceover with the media portion to generated an endorsed media portion.

3. The method of claim 1, further comprising:
receiving, at a server, a selection of an endorser from a client device;
generating an avatar of the endorser; and
prior to publishing the media portion, combining the generated avatar of the endorser with the media portion to generated an endorsed media portion.

4. The method of claim 1, further comprising:
receiving the media file;
chunking the media file into a plurality of portions, wherein each of the plurality of portions is transcribed and extracted for one or more sentiments; and
associating the extracted sentiments of each of the plurality of portions to one or more keywords in each respective portion.

5. The method of claim 1, further comprising:
determining a timestamp and duration of the analyzed portion of the audio data; and
extracting words from the transcribed script based on the timestamp and the duration of the analyzed portion, wherein extracted words are associated with the assigned sentiment value.

6. The method of claim 1, wherein the comparison of the base and second wave profiles comprises comparing changes in one or more of a wave amplitude and a wave frequency.

7. The method of claim 1, wherein each of the wave profiles comprises an amplitude profile and a frequency profile.

8. The method of claim 1, wherein assigning sentiment value further comprises:
assigning sentiment value to the portion of the media file based on one or more of geographic location, time, type of platform where the media filed was originally published.

9. A non-transitory processor-readable medium having one or more instructions operational on a computing device, which when executed by a processor causes the processor to:
transcribe a first portion of a media file to produce a transcribed script for the media portion;
determine a baseline wave profile of speech from audio data of the media file;

analyze audio data of the first portion of the media file to produce a second wave profile for the first portion;

assign sentiment value to the first portion of the media file based on comparison between the base and second wave profiles;

associate the sentiment value of the first portion to one or more keywords in the transcribed script;

analyze information from one or more sites on the Internet to determine a trending topic; and publish the media portion over the network based on a match between the trending topic and the one or more keywords associated with the sentiment value of the first portion.

10. The non-transitory processor-readable medium of claim 9, further comprising one or more instructions operational on a computing device, which when executed by a processor causes the processor to:

receive a selection of an endorser from a client device;

generate an avatar of the endorser; and prior to publishing the media portion, combine the generated avatar of the endorser with the media portion to generated an endorsed media portion.

11. The non-transitory processor-readable medium of claim 9, further comprising one or more instructions operational on a computing device, which when executed by a processor causes the processor to:

receiving, at a server, a selection of an endorser from a client device;

sending the transcribed script of the media portion to the endorser;

receiving a voiceover of the endorser, wherein the voiceover is based on the transcribed script;

prior to publishing the media portion, combining the received voiceover with the media portion to generated an endorsed media portion.

12. The non-transitory processor-readable medium of claim 9, further comprising one or more instructions operational on a computing device, which when executed by a processor causes the processor to:

receive the media file;

chunk the media file into a plurality of portions, wherein each of the plurality of portions is transcribed and extracted for one or more sentiments; and associate the extracted sentiments of each of the plurality of portions to one or more keywords in each respective portion.

13. The non-transitory processor-readable medium of claim 1, further comprising one or more instructions operational on a computing device, which when executed by a processor causes the processor to:

determine a timestamp and duration of the analyzed portion of the audio data; and extract words from the transcribed script based on the timestamp and the duration of the analyzed portion, wherein extracted words are associated with the assigned sentiment value.

14. The non-transitory processor-readable medium of claim 1, wherein the comparison of the base and second wave profiles comprises comparing changes in one or more of a wave amplitude and frequency.

15. The non-transitory processor-readable medium of claim 1, wherein each of the wave profiles comprises an amplitude profile and a frequency profile.

16. The non-transitory processor-readable medium of claim 9, wherein assign sentiment value comprise:

assigning sentiment value to the first portion of the media file based on one or more of geographic location, time, type of platform where the media filed was originally published, and frequency of publication.

17. A method for publishing media assets, comprising:

transcribing, at a server, a first portion of a media file to produce a transcribed script of the first portion;

sending the transcribed script of the first portion to an endorser;

receiving a voiceover of the endorser based on the sending of the transcribed script, wherein the voiceover is based on the transcribed script;

determining a baseline wave profile of speech from audio data of the media file;

analyzing audio data of the first portion of the media file to produce a second wave profile for the analyzed portion;

assigning sentiment value to the first portion of the media file based on comparison between the base and second wave profiles;

extracting one or more keywords in the transcribed script of the first portion associated with the sentiment value;

analyzing, at the server, information from one or more sites on the Internet to determine a trending topic;

combining the received voiceover with the media portion to create an endorsed media portion; and publishing the endorsed media portion over the network based on a match between the trending topic and the one or more keywords associated with the sentiment value.

* * * * *